United States Patent [19]

Hufford et al.

[11] Patent Number: 5,782,571

[45] Date of Patent: Jul. 21, 1998

[54] TOOL MOUNT FOR AUTOMATIC COUPLING WITH ROBOTIC EQUIPMENT

[75] Inventors: Donald L. Hufford, Marco Island, Fla.; Maurice Samuel Perlman, Southfield; William Louis Scott, East Jordan, both of Mich.

[73] Assignee: CPI Products, L.C., Plymouth Township, Mich.

[21] Appl. No.: 733,667

[22] Filed: Oct. 17, 1996

[51] Int. Cl.$^6$ .................................................. B25J 11/00
[52] U.S. Cl. ............................ 403/31; 403/288; 403/322; 901/27; 901/41
[58] Field of Search .......................... 403/31, 13, 15, 403/34, 288, 321, 322; 285/26, 29, 306, 920; 901/27, 31, 41

[56] References Cited

U.S. PATENT DOCUMENTS

| | | | |
|---|---|---|---|
| 4,636,135 | 1/1987 | Bancon | 901/41 X |
| 4,763,401 | 8/1988 | Marinoni et al. | 901/30 X |
| 4,793,053 | 12/1988 | Zuccaro et al. | 901/30 X |
| 4,809,747 | 3/1989 | Choly et al. | 901/41 X |
| 5,294,209 | 3/1994 | Naka et al. | 901/30 X |

FOREIGN PATENT DOCUMENTS

| 268056 | 5/1988 | European Pat. Off. | 901/41 |
|---|---|---|---|

OTHER PUBLICATIONS

Robotic Accessories, Division of Process Equipment Company: *Tool Changer*, published prior to Oct. 17, 1995.
ATI Industrial Automation, *Quick Change*, published prior to Oct. 17, 1995.
EOA Systems *Quick Change Adaptor*, published prior to Oct. 17, 1995.

Robohand Inc., *Robot and Tool Adaptor*, published prior to Oct. 17, 1995.

Automation Products Group, *Robo Set Automatic Tool Changer*, published prior to Oct. 17, 1995.

Applied Robotics, Inc., *XChange System*, published prior to Oct. 17, 1995.

Assurance Technologies, Inc., *Robotic Tool Changer Locking Comparison*, published prior to Oct. 17, 1995.

*Primary Examiner*—Anthony Knight
*Attorney, Agent, or Firm*—Van Dyke, Gardner, Linn & Burkhart, LLP

[57] ABSTRACT

An automatic tool mounting assembly for robotic equipment that includes a base mounting member and a tool carrier member. Radially extending locking posts are radially aligned with the seal between the base and tool carrier. Pneumatic connections within the base and tool carrier provide a seal at the interface surface of the two connector sections so as to avoid the use of sockets and O-ring seals. The pneumatic connection interfaces are also radially aligned with the locking posts and seal in order to accommodate a wide tolerance for misalignment during connection and disconnection of the base and tool carrier.

43 Claims, 12 Drawing Sheets

TOOL MOUNT FOR AUTOMATIC COUPLING WITH ROBOTIC EQUIPMENT

BACKGROUND OF THE INVENTION

The invention relates to interchangeable tool mounts for robotic equipment and, in particular, tool mounts that provide fluid connections used to supply a source of pressurized fluid from the robot to the tool to be manipulated by the robot.

Robotic equipment has been utilized in industry to perform a wide ranging variety of tasks. Robotic equipment is highly adaptable to different functions and can be programmed to perform different tasks according to the operator's needs. For different tasks, however, the robot normally must be equipped with and manipulate different industrial tools which are task specific. For example, an industrial robot may be programmed with a material handling function and provided with a support boom that carries vacuum cups, pneumatically operated clamps, or the like to hold the material to be handled. The same industrial robot may be programmed to screw in fasteners and would be equipped with a pneumatically operated driver tool. Although a robot may be programmed to perform different functions in sequence, in order to perform the various selected functions, the tools mounted on the robot must be changed.

In instances where a robot is programmed to repeatedly perform a single task, it is possible to manually change the tool mounted on the robot during downtime as the robot is being reprogrammed to the new task. In the performance of a sequence of tasks, however, the manual changing of tools is not efficient, and the robot must, therefore, be enabled to automatically switch tools between sequential tasks.

Various tool mounts or connectors have been developed for mounting work tools on robotic equipment. In one example of a prior art, manually operated tool mount shown in FIGS. 15-18, a base 200 forming a female socket is mounted on the robot, and the tool (not shown) is clamped on a mating tool carrier 202. The tool carrier 202 carries a pair of opposed posts 204 that are received in a pair of diametrically opposed slots 206 on the base socket 200 such that the posts 204 protrude from the sides of the base socket 200. A pair of manually operated hooks 208 engage over the protruding posts 204 of the tool carrier 202 in order to secure the tool carrier in place. The locking handle 210 is manually pulled into a locked position shown in FIG. 16 in order to lock base socket 200 and tool carrier 202 together. A tapered seal 212 at the base of the socket 200 results in a tight seal between the base and the tool carrier. A second tapered seal 216 contacts another tapered shoulder 218 along the body of tool carrier 202. In order to provide a supply of pressurized air for pneumatic operation of a tool carried by tool carrier 202, a series of pneumatic connections were made between the robotic base socket 200 and the received end of the tool carrier 202. The tool carrier 202 included a series of deep sockets 220, while a complementary set of pneumatic nozzle outlets 222 protruded within the base socket 200. Each pneumatic nozzle included an O-ring seal 224 about the cylindrical body of the nozzle 222. The pneumatic nozzle outlets 222 were required to be carefully aligned for insertion into the receiving sockets 220 formed in the tool carrier 202. Due to the deep socket well of base socket 200, binding and connection difficulties were experienced unless precise alignment of pneumatic nozzle outlets 222 and sockets 220 was maintained. Manual connection was required in order to ensure correct alignment and, thus, avoid damage to the pneumatic nozzles.

A variety of automatic tool mounts have been developed in order to permit an industrial robot to itself change between different tools. A first tool is mounted on a first tool carrier member, while a base member is mounted on the robotic arm of the robot. The tool carrier with tool attached is placed in a stand or rack next to other tool carrier members outfitted with tools of different design and function. In order to change tools, the robotic arm places a coupled tool carrier member in the support rack and disengages the tool carrier member. The robotic arm backs the base member away from the first tool carrier, and then moves into registry with the new tool carrier member. Once the robotic base member is correctly aligned with the new tool carrier member, the robotic arm moves the base member into engagement with the tool carrier member and makes the connection.

A difficulty with conventional automatic tool assemblies for robotic equipment is the requirement of precise alignment between the base member and tool carrier member during connection and disconnection. A slight variation in alignment can seriously damage pneumatic feed nozzles that form a connection within the base member and tool carrier member. Deep sockets on one member that receive protruding pneumatic nozzles on the opposed member are required to form a seal along the side of the pneumatic nozzle. The robotic arm must move the base member in a very precise linear motion in order to effect the connection and disconnection. Any twisting or rolling of the tool carrier member would result in damage to the internal pneumatic feed nozzles. This causes difficulties in programming the motion of the robot. Further, any hysteresis in the equipment motion, slight movement of the rack used to support the tool carrier member, or other slight variance can result in improper alignment of the tool mount and damage to the equipment.

SUMMARY OF THE INVENTION

The present invention is preferably embodied in an automatic tool mount assembly for robotic equipment. A base member is mounted onto the robot arm or other manipulative part of the robotic equipment, while the work tool is mounted on a mating tool carrier member. Pneumatic feed nozzles protrude from the base member and each includes an axially moving shut-off valve that protrudes from the body of the pneumatic nozzle. A rubber boot carried on the tool carrier member includes circular seats about each pneumatic inlet port complementary to the pneumatic nozzles. The circular seats engage the forward face of the pneumatic nozzle valves in order to form an airtight seal at the forward face of the pneumatic nozzles. The circular seats are flexible in order to provide tolerance to the contact with the pneumatic nozzle's valve surface. Since the seal is formed at the front face of the pneumatic supply nozzles, the nozzles are not required to be received into a substantial socket or other recess that mandates specific alignment. Further, in the event that there is twisting or other nonlinear motion between the base member and tool carrier member during connection or disconnection, the protruding pneumatic nozzles are not bent or otherwise damaged.

In another preferred aspect of the invention, the base member forms a socket with a peripheral wall. A raised pad centrally disposed within the base member socket includes a number of generally radially extending locking posts that engage bars or seats formed on the tool carrier member. The locking bars are biased in order to retract inwardly, and are urged outwardly toward a locked position by an axially reciprocating, pyramidally shaped actuation piston. One of the base member and tool carrier member form a tapered seat about the outer periphery of the member, while the other member carries a tapered wall for engaging the tapered seat. A tapered seal about the tapered seat is generally radially aligned with the locking posts. The locking posts are, therefore, generally radially aligned with the connection and seal between the base member and tool carrying member, which permits the connection to be made despite relatively large misalignment between the base member and tool carrier member. Preferably, a pair of conical posts on one of the base member and tool carrier member are received in cylindrical sockets on the other member in order to further bring the coupled members into alignment upon assembly. As a result of the generally radial alignment between the locking mechanism and the seal, as well as the utilization of a pneumatic seal being formed on the front faces of the pneumatic nozzles, the tool carrier member may be twisted, rolled, or otherwise removed from the base member in a nonlinear fashion without damage to the equipment.

These and other benefits, functions, results, and objects of the invention will be recognized by one skilled in the art from the specification and claims which follow, as well as the drawings attached hereto.

DETAILED DESCRIPTION OF THE PREFERRED EMBODIMENTS

Figure 1:
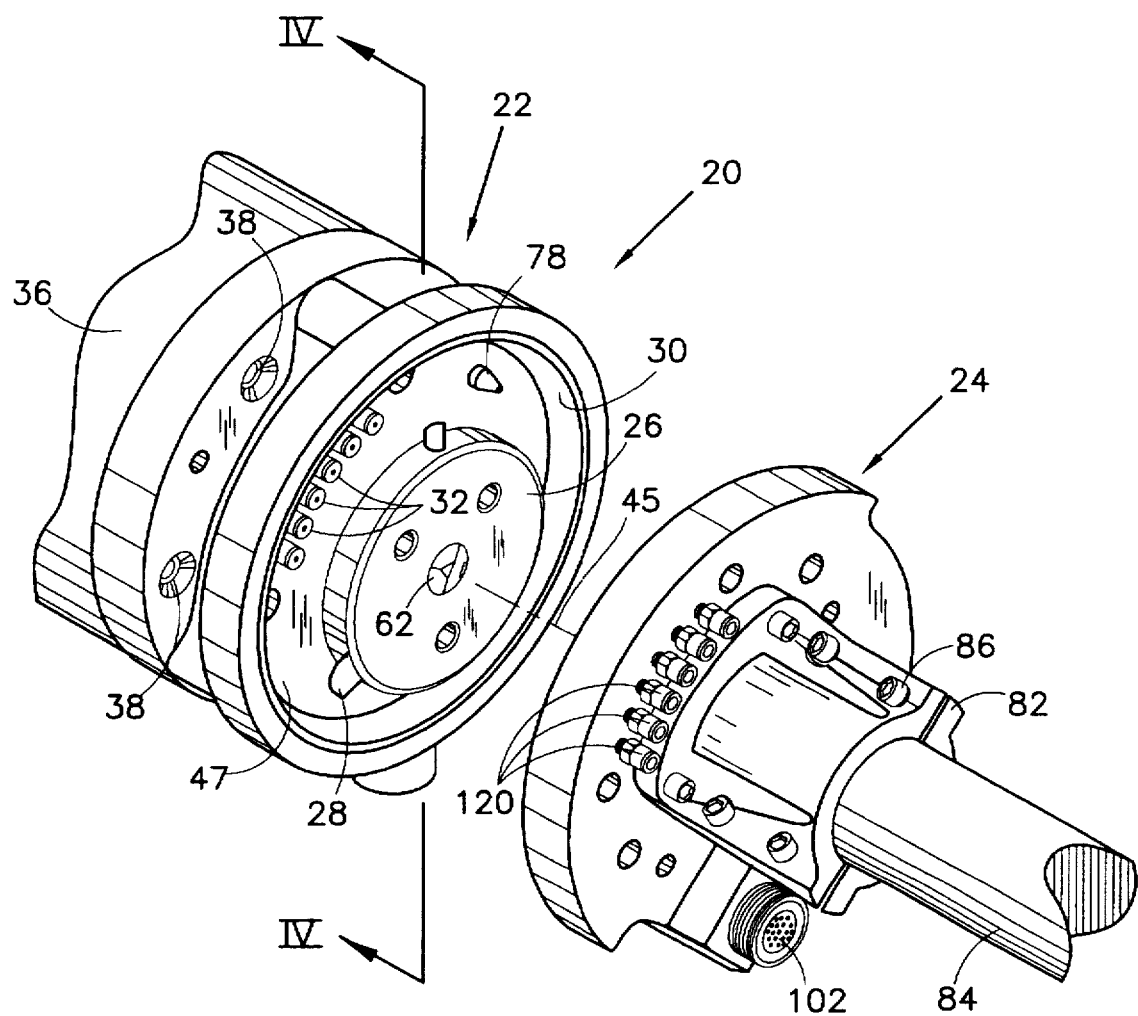
FIG. 1 is fragmentary, perspective view of a robot tool mounting assembly embodying the present invention, shown from the tool side toward the robotic equipment.

The invention is embodied in a tool mounting assembly for robotic equipment, shown in FIG. 1 and referenced generally as numeral 20. Assembly 20 includes a base mounting member or base 22 which is coupled to a tool carrier member or tool carrier 24. A raised connecting pad 26 is centrally disposed on the outer facing surface of base 22 so as to be oriented facing tool carrier 24. A set of radially extending locking posts 28 project from connecting pad 26. Locking posts 28 reciprocate generally radially and seat in tool carrier 24 in order to lock tool carrier 24 into positive engagement with base 22. A tapered seal 30 is formed on the outer periphery of base 22 and forms a tapered seat for tool carrier 24. A series of pneumatic supply nozzles 32 (FIG. 1) are carried on base 22 within the perimeter of tapered seal 30, while an elastomeric boot 34 (FIG. 2) forms a series of mating seats which seal against the forward surfaces of nozzles 32. The generally radial alignment of locking posts 28, tapered seal 30, and the interface between pneumatic supply nozzles 32 and boot 34 provide tool mounting assembly 20 with a substantially large tolerance to misalignment and nonlinear motion of base 22 relative tool carrier 24 during connection and disconnection.

Base mounting member 22 is fixedly mounted on a robot arm 36 (FIG. 1). Mounting bolts 38 or other suitable fasteners are used in the connection of base mounting member 22 to robot arm 36. Base mounting member 22 is generally cylindrical in shape, having a generally circular mounting plate 40 (FIG. 5) which provides access to mounting bolts 38. A body 42 projects axially from mounting plate 40, and a face plate 44 forms the surface facing tool carrier member 24. Robot arm 36 normally advances base mounting member 22 along a linear axis of travel 45 during mounting and disconnection with tool carrier 24.

Figure 5:
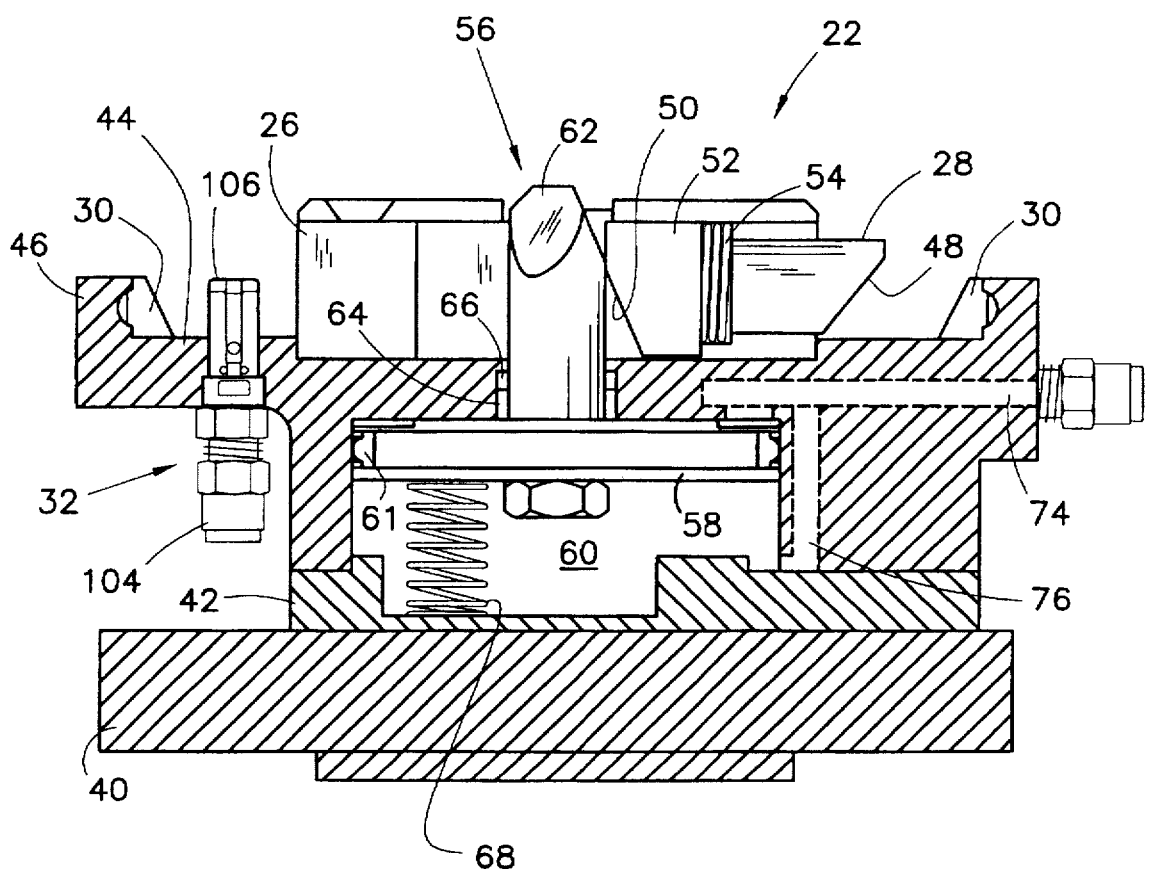
FIG. 5 is a side sectional view taken along plane V—V of FIG. 3, with the base mounting member shown in a locked condition.
Figure 6:
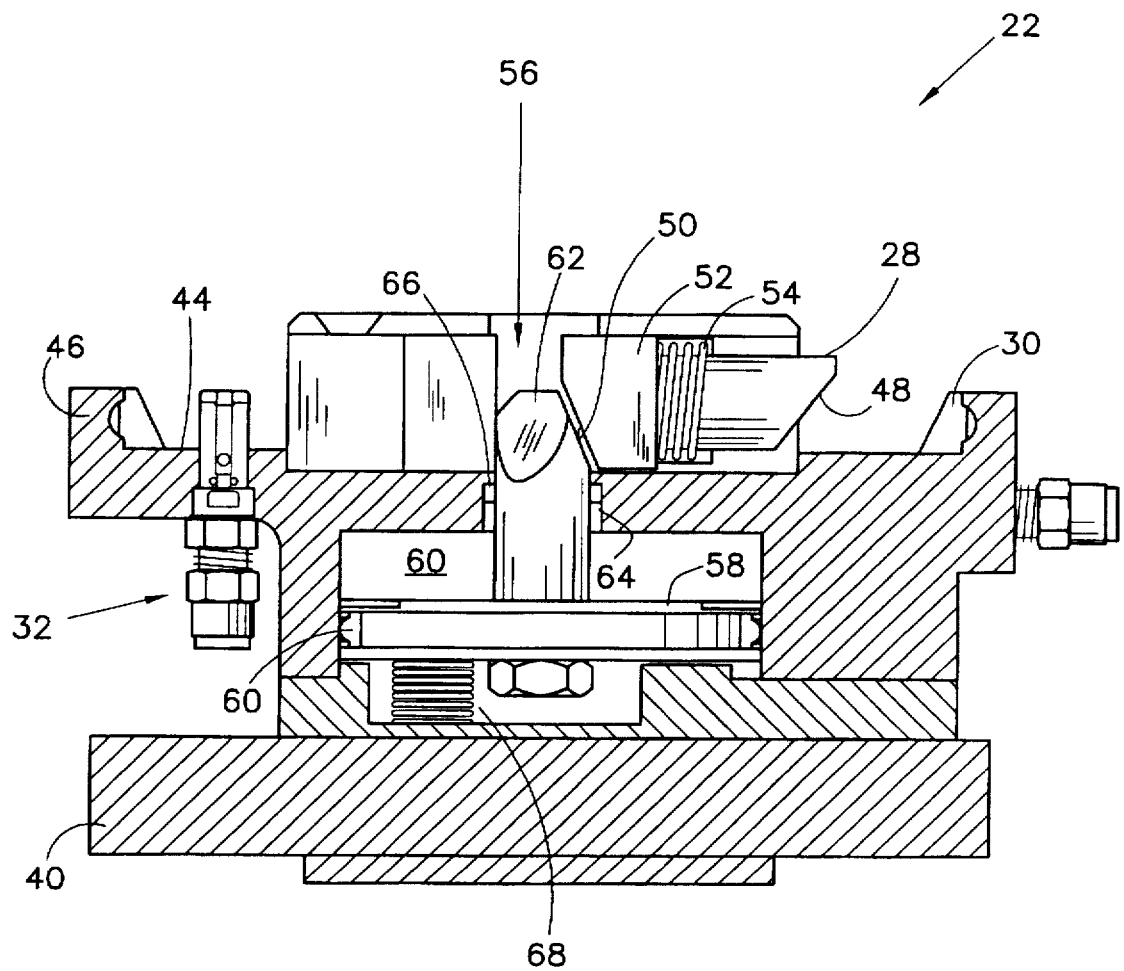
FIG. 6 is a side sectional view of the base mounting member shown in FIG. 5, shown in a retracted, disconnected condition.

A peripheral wall 46 (FIG. 5) extends about the periphery of face plate 44 in order to create a shallow receiving socket 47 that seats tool carrier 24. As shown in FIG. 5, tapered seal 30 is preferably a polymeric material, and most preferably urethane, that is adhered or otherwise secured about the inner surface of peripheral wall 46. Most preferably, tapered seal 30 is roughly 7 ¼ inches in diameter by ½ inch high. Tapered seal 30 is preferably formed from a urethane material in order to form a self-lubricating seal with an engaging surface that positively positions tool carrier 24.

Figure 3:
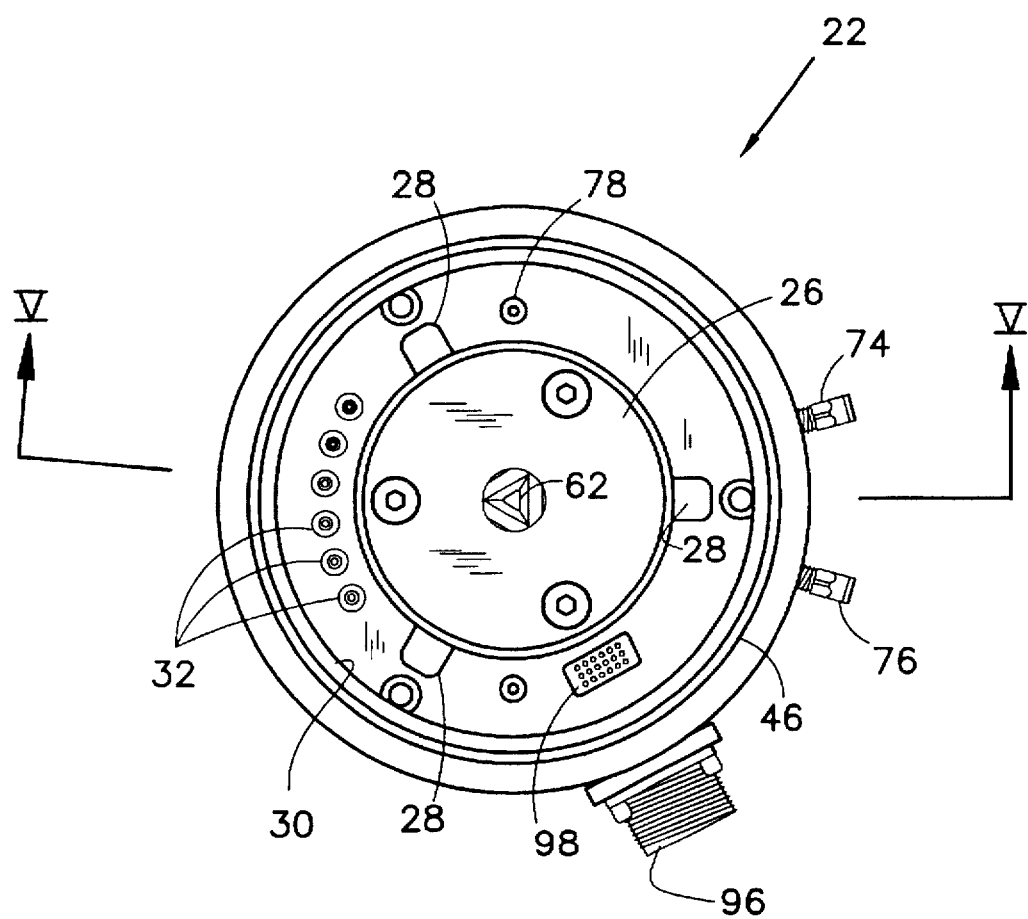
FIG. 3 is a elevational view of the base mounting member of the robot tool mounting assembly shown in FIG. 1 with the base mounting member in an extended, locked condition.
Figure 4:
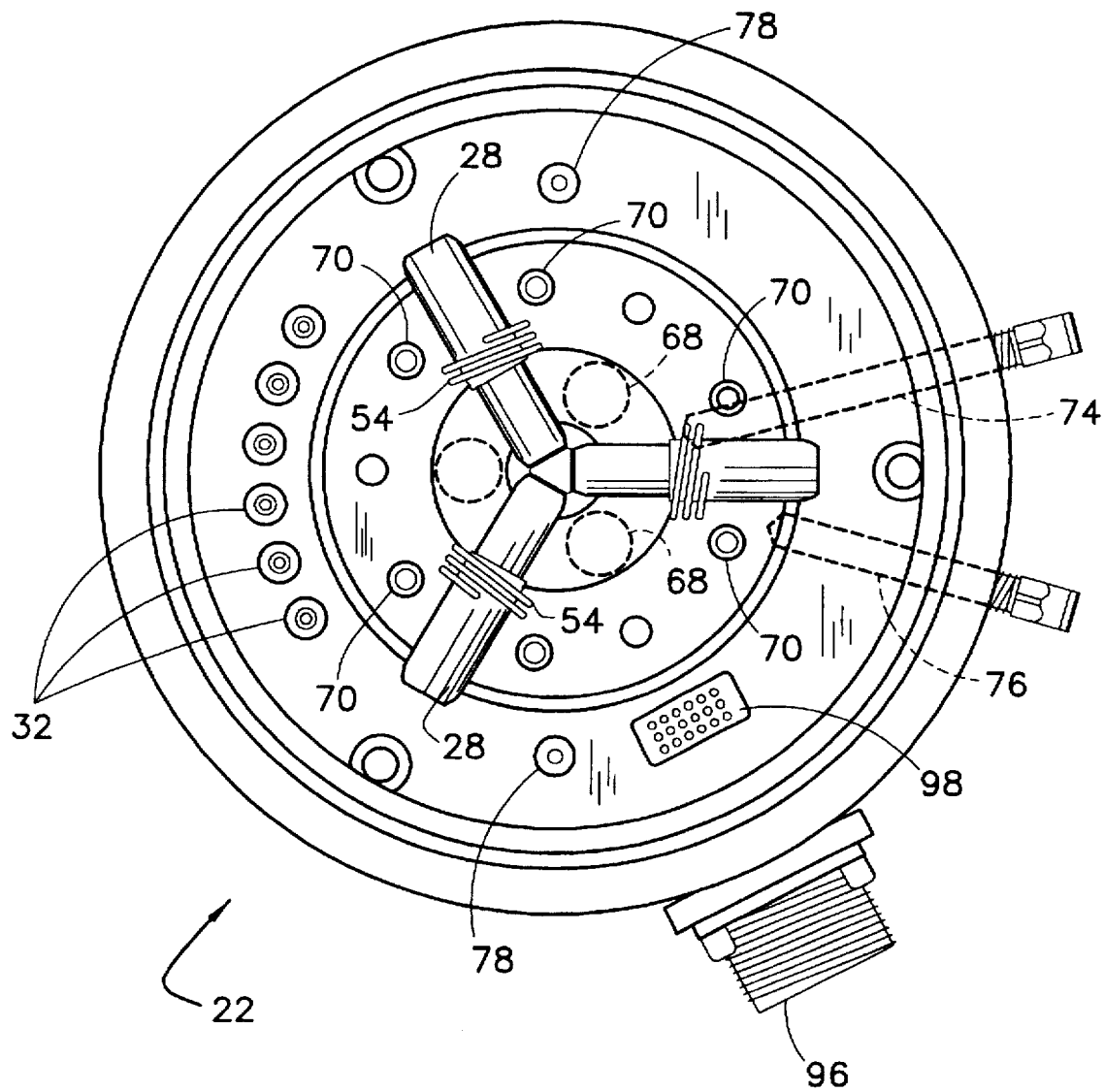
FIG. 4 is a sectional, elevational view taken along plane IV—IV of FIG. 1, with the base mounting member in a retracted, disconnected condition.

Connecting pad 26 is a circular disk-shaped pad centrally located and protruding from face plate 44. Connecting pad 26 is preferably 4 ¼ inches in diameter by 1 ¼ inches tall, so as to extend slightly past peripheral wall 46. Three locking posts 28 are arrayed about the perimeter of connecting pad 26 and protrude generally radially as shown in FIG. 3. Alternatively, locking posts 28 may extend along a nondiametric cord, and may alternatively be ramped to reciprocate at an oblique angle to axis 45. Locking posts 28 are generally cylindrical with a tapered locking surface 48 that protrudes from connecting pad 26, and a tapered activation surface 50 within connecting pad 26. Locking surfaces slope at an acute angle relative to face plate 44 in order to assist in forming a tight lock with tool carrier 24, as is later described. Each locking post 28 has an enlarged base 52 (FIG. 5) that forms a seat for a retraction spring 54. Springs 54 bias locking posts 28 inwardly toward a retracted position shown in FIG. 4.

A centrally located activation piston 56 urges locking posts 28 radially outwardly toward a locked position as shown in FIG. 3. Activation piston 56 reciprocates along axis of travel 45 between an extended, locked position and a retracted, disengaged position. Activation piston 56 has an enlarged disk-shaped head 58 (FIG. 5) that reciprocates within a piston chamber 60 within base body 42. Piston head 58 includes an annular seal 61. Activation piston 56 includes a shaft that extends axially through a central aperture through face plates 44 and connecting pad 26. Activation piston 56 terminates in a three-sided tapered end 62. Tapered end 62, when forced outwardly through connecting pad 26, engages activation surfaces 50 on locking posts 28 and, thus, urges locking posts 28 outwardly. Activation piston 56 is carried by a bronze bushing 64 in order to provide easy reciprocation and an O-ring seal 66 that forms a pneumatic seal. Three activation springs 68 are positioned within piston chamber 60 between piston head 58 and mounting plate 40. Activation springs 68 bias activation piston 56 into a normally protruded, locked position.

Figure 9:
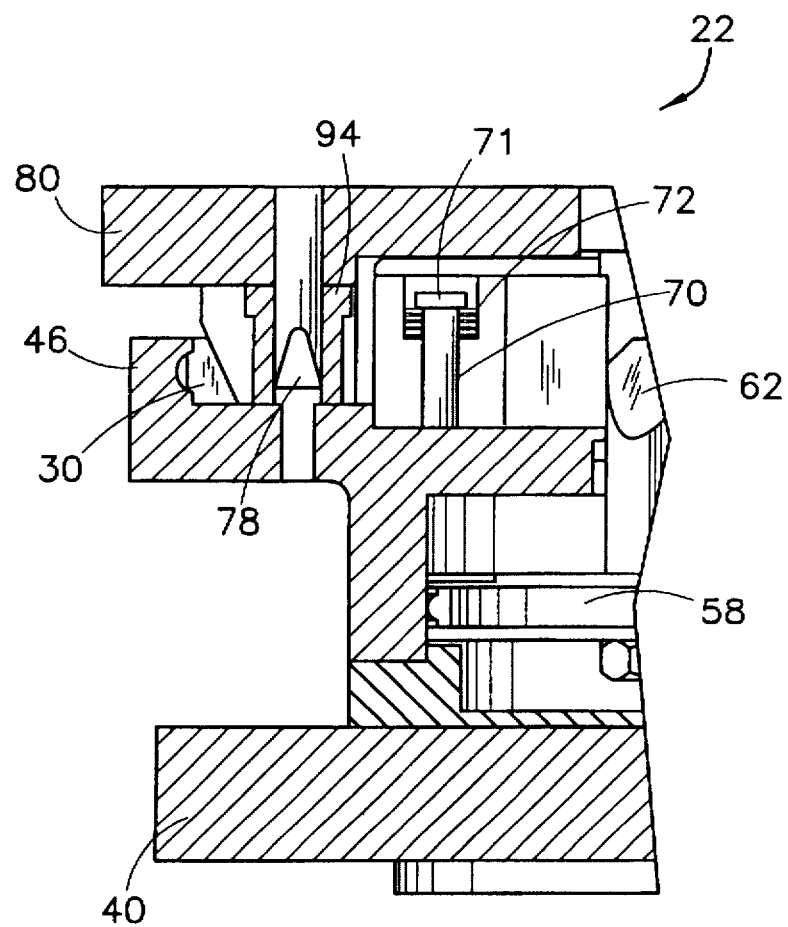
FIG. 9 is a side sectional view of the base mounting member and tool carrier member of FIG. 1 shown assembled in a disconnected condition.
Figure 10:
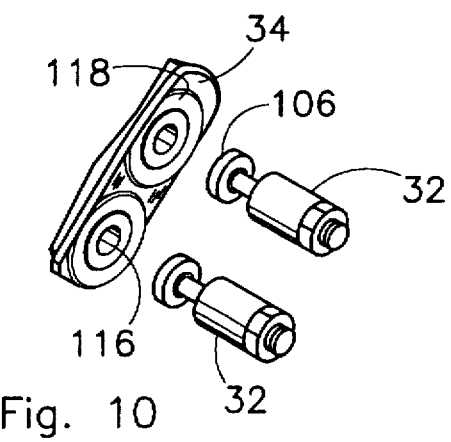
FIG. 10 is a perspective view of the pneumatic supply connection between pneumatic outlet nozzles and inlet boot with seat seals embodying the present invention.

Six smooth-sided alignment bolts 70 have threaded ends received in base body 42. Bolts 70 pass through smooth bores within connecting pad 26 (FIG. 9) and terminate in enlarged heads 71. Seated beneath enlarged head 71 of each alignment bolt 70 in an enlarged chamber are three bellville springs 72. Alignment bolts 70 and bellville springs 72 permit connecting pad 26 to shift slightly away from face plate 44 in the event of slight misalignment between base 22 and tool carrier 24 during coupling. Bellville springs 72 bias connecting pad 26 back into firm abutment with face plate 44 once base 22 and tool carrier 24 are firmly coupled. Alignment bolts 70 and beliville springs 72 allow for misalignment during coupling without resultant damage to components as activation piston 56 is raised, as well as assist locking posts 28 in drawing base 22 and tool carrier 24 into tight engagement.

A pair of pneumatic activation inlet ports 74 and 76 form inlets for pressurized air used in the reciprocation of activation piston 56. Inlet port 74 provides a supply of compressed air to the upper surface (FIG. 5) of piston head 58 in order to force activation piston 56 toward a retracted position. Inlet port 76 extends to the side of chamber 60 closest to mounting plate 40 and, thus, supplies the spring-biased side of activation piston head 58. Both ports 74 and 76 each include a conventional pneumatic connector for connection to a pneumatic supply tube or line (not shown).

A pair of diametrically aligned conical posts 78 project from face plate 44. Conical posts 78 are located between connecting pad 26 and peripheral wall 46. Conical posts 78 preferably are formed from a tool steel and are approximately 7/16 inch in diameter and 1 1/4 inches tall. Conical posts 78 assist in the aligning of base 22 and tool carrier 24, as is later described. The conical shape of posts 78 also allows for twisting or rolling separation of base 22 and tool carrier 24 without damage to posts 78 or other components.

Figure 2:
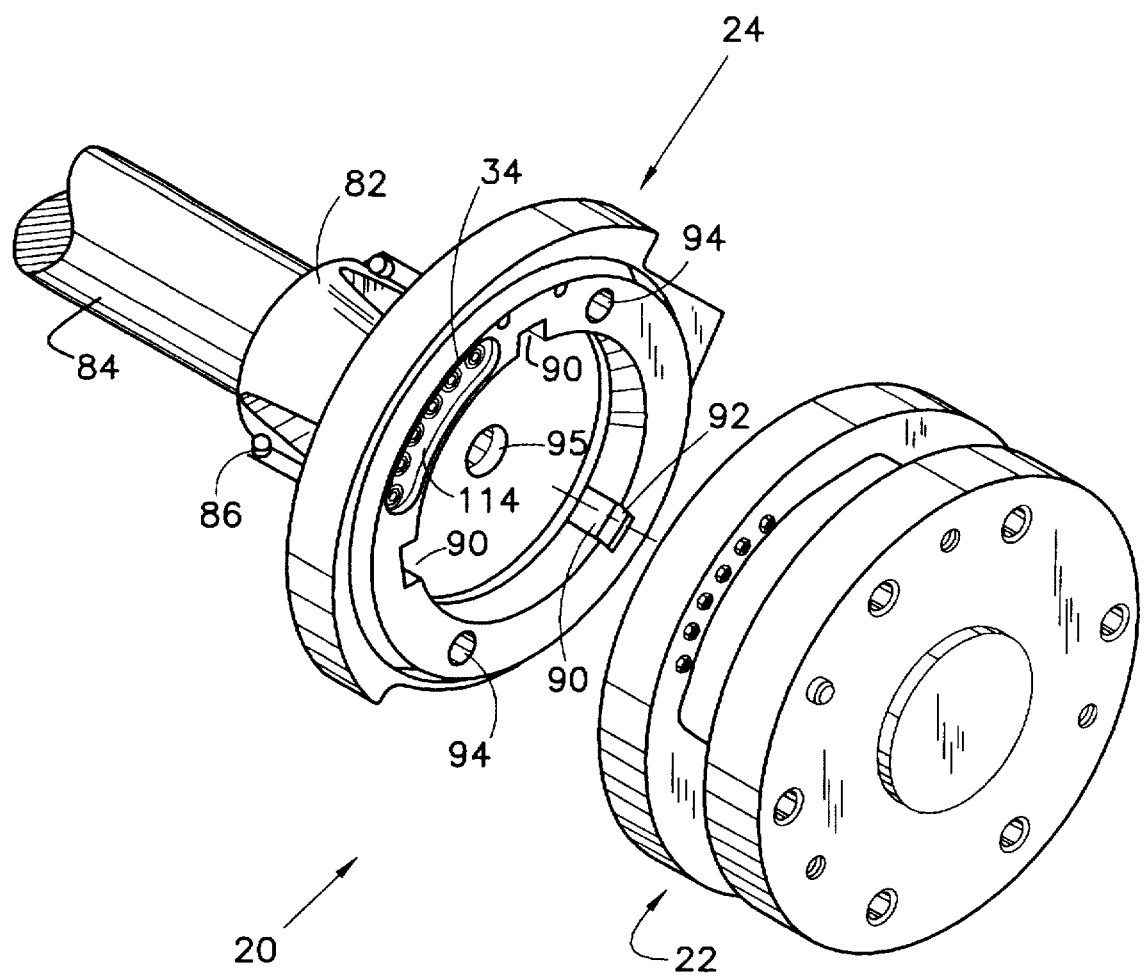
FIG. 2 is a fragmentary, perspective view of the robot tool mounting assembly of FIG. 1, shown from the robot side facing toward the tool mounting carrier.
Figure 7:
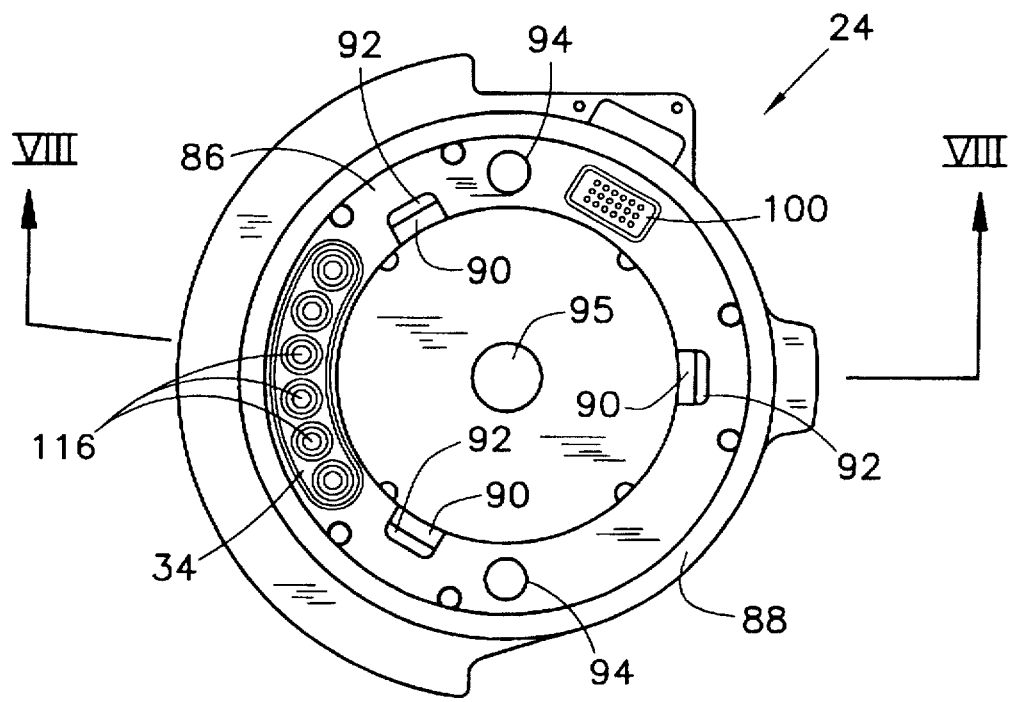
FIG. 7 is a fragmentary, elevational view of a tool carrier member of FIG. 1.
Figure 8:
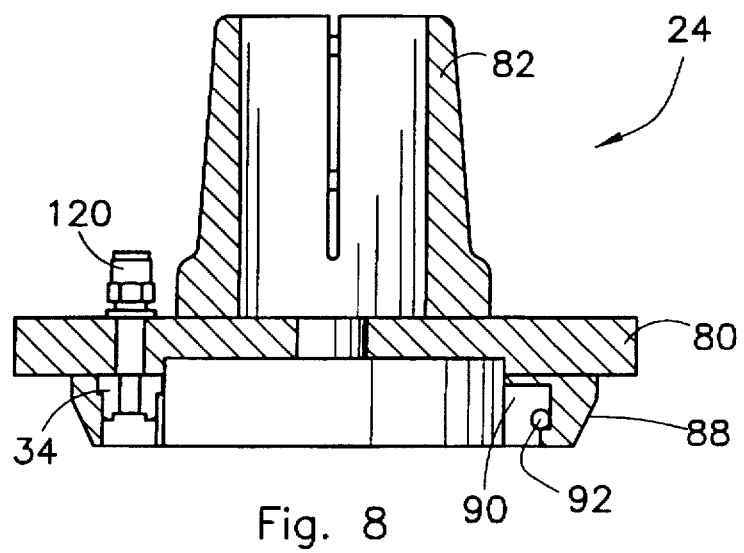
FIG. 8 is a side sectional view of the tool carrier member taken along plane VIII—VIII of FIG. 7.

Tool carrier member 24 includes a cylindrical carrier plate 80 from which protrudes a tool clamp 82 (FIG. 8). Tool clamp 82 is clamped onto an industrial tool 84 as selected by the operator. As shown in FIG. 1, tool 84 is a boom used to carry vacuum cups, sensors, and other material handling equipment. Tool clamp 82 is a split socket clamped tightly about the base of tool 84 by bolts 86 (FIG. 2). As shown in FIG. 8, protruding from carrier plate 80 toward base 22 is a circular sealing wall 87. Sealing wall 87 has a conically tapered outer wall surface 88 that mates with the tapered inner surface of seal 30 (FIG. 8). Equidistantly spaced about the inner surface of sealing wall 87 are three notches 90 (FIG. 7). Secured within each notch 90 is a locking pin 92. Locking pins 92 are formed of hardened steel and are preferably approximately 3/8 inch in diameter. Locking pins 92 are spaced away from the inner wall of notches 90 nearest carrier plate 80 in order to form a seating region or lock seat beneath locking pin 92. Locking surfaces 48 on locking posts 28 seat beneath locking pins 92 when tool mounting assembly 20 is assembled and engaged. The acute angle of locking surfaces 48 causes locking posts 28 to draw tool carrier member 24 toward base mounting member 22 as locking posts 28 are forced outwardly beneath the smoothly curved exterior of locking pins 92.

A pair of post sockets 94 are diametrically aligned and open out through the end of sealing wall 87 facing base 22. Post sockets 94 are formed from steel sleeves fit into apertures in tool carrier 24 and are dimensioned to receive conical posts 78. The conical taper of conical posts 78 allows for misalignment with post sockets 94, and turn tool carrier member 24 into proper alignment as assembly 20 is brought together. The hardened steel surfaces reduce wear on other parts of assembly 20. A central aperture 95 on carrier plate 80 provides clearance for tapered end 62 of activation piston 56.

A bundled electrical cable connector 96 (FIG. 4) provides a point of connection for power to be supplied to tool 84. Electrical connector contacts 98 are located on face plate 44 and are operably coupled to electrical cable connector 96. Tool carrier member 24 includes spring-loaded electrical connector contacts 100 (FIG. 7) which are positioned to mate with electrical connector contacts 98. Electrical connector contacts 100 are connected with electrical cable connector 102 (FIG. 1) on the opposite side of carrier plate 80 facing toward tool 84. Cable connector 102 provides an electrical outlet for supplying electrical power to tool 84 as required for the operation of tool 84 or for providing electrical power to the workpiece.

Figure 11:
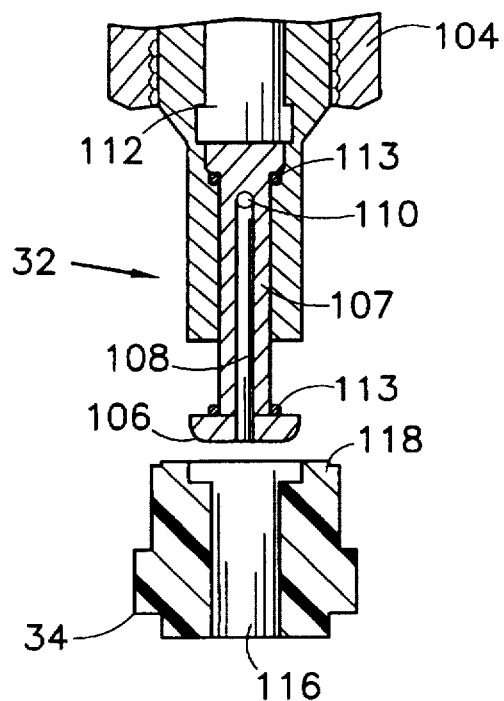
FIG. 11 is a side sectional view of the pneumatic supply connection of FIG. 10.
Figure 12:
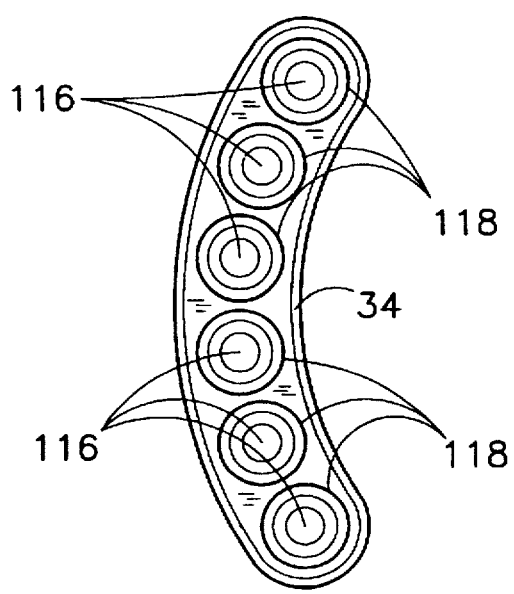
FIG. 12 is an elevational view of the pneumatic connection boot with seat seals of FIG. 10.
Figure 13:
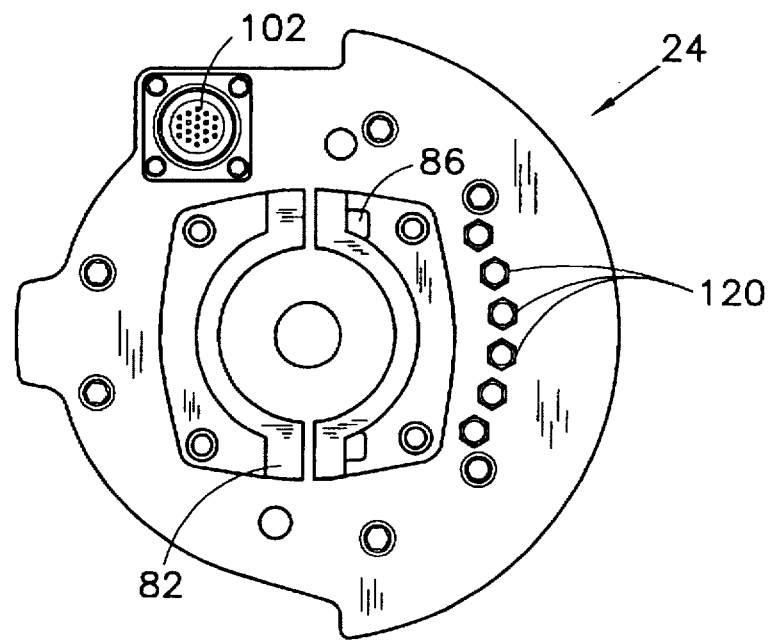
FIG. 13 is an end elevational view of the tool end of the tool carrier shown in FIG. 1.
Figure 14:
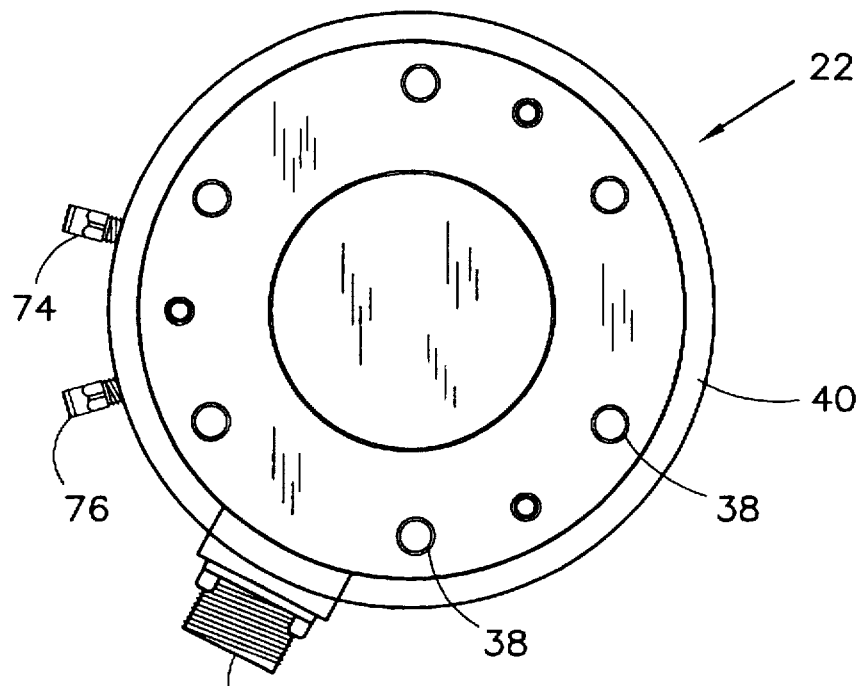
FIG. 14 is an end elevational view of the robot arm side of the base mounting member shown in FIG. 1.
Figure 15:
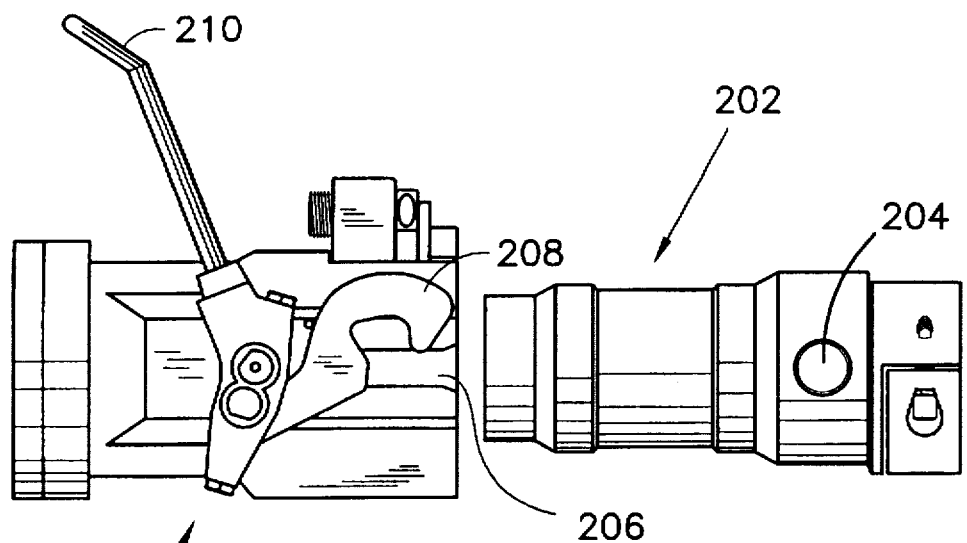
FIG. 15 is an elevational view of a prior art, manually operated tool mount assembly for robotic equipment shown in a disconnected condition.
Figure 16:
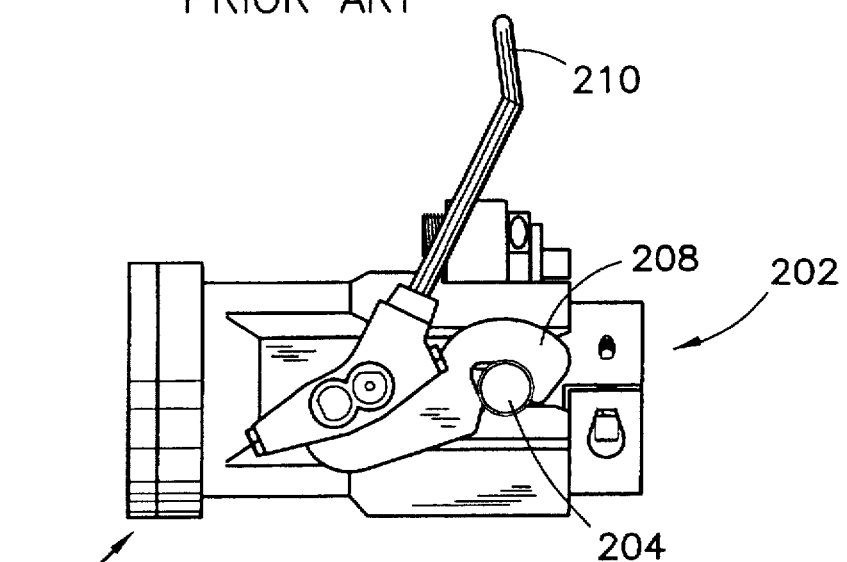
FIG. 16 is an elevational view of the prior art, manually operated tool mount assembly of FIG. 15, shown in a connected condition.
Figure 17:
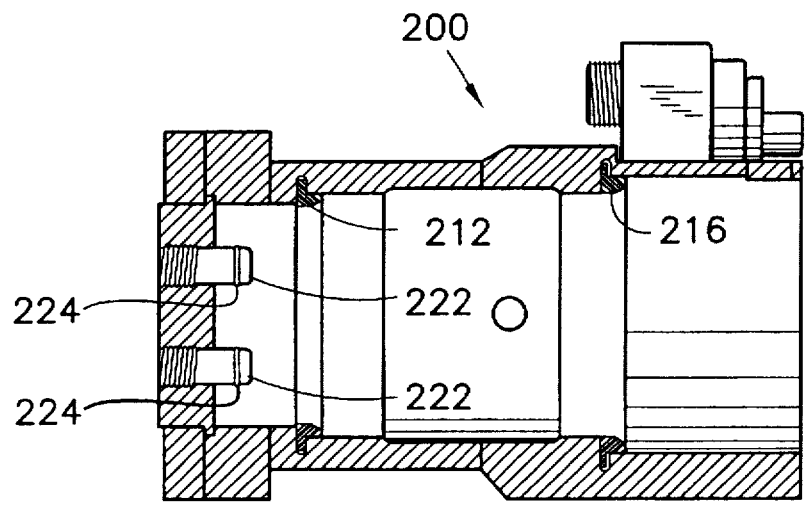
FIG. 17 is a sectional elevational view of the prior art tool carrier of the assembly of FIG. 15.
Figure 18:
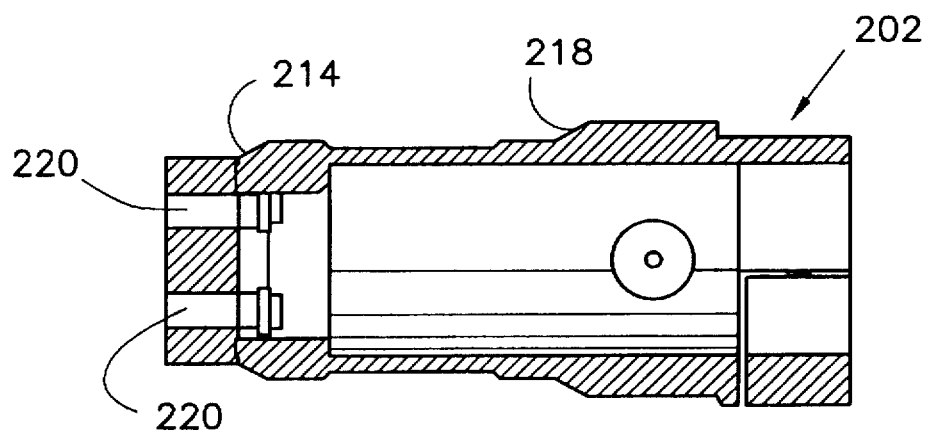
FIG. 18 is a sectional elevational view of the prior art base member of the assembly of FIG. 15.

As shown in FIG. 5, each pneumatic supply nozzle 32 includes a conventional pneumatic connector 104. Nozzle 32 extends through face plate 44 and terminates in a circular disk-shaped end with a valve face 106 (FIG. 11). Valve face 106 is carried on a narrow stem or cylindrical body 107 that slidably reciprocates within pneumatic supply nozzle 32 (FIG. 11). An axial bore 108 extends through stem 107 and opens through valve face 106. A radially opening inlet port 110 is formed in cylindrical body 107 forward of an enlarged base of the valve. An enlarged chamber 112 receives the valve's enlarged end when valve face 106 is depressed into the body of nozzle 32. When valve face 106 is depressed, bore inlet 110 is in communication with chamber 112 in order to provide compressed air through bore 108 and out valve face 106. When valve face 106 is released, the pressurized air forces the valve to slide outwardly and, thus, seal off inlet 110, halting delivery of compressed air. A pair of O-rings 113 carried on stem 107 selectively form seals with supply nozzle 32 at both ends of stem's 107 travel.

An arcuate recess 114 is formed in the end of sealing wall 87 (FIG. 2). Elastomeric boot 34 fits snugly in arcuate recess 114. Boot 34 is arcuately shaped, preferably with six inlet ports 116 spaced along its length. A raised, circular ridge 118 encircles each air port 116. Each ridge 118 forms a seal that abuts against valve face 106 when nozzle 32 is forced against boot 34 (FIG. 11). Ridge 118 overlaps slightly along the sides of valve face 106 when in a connected condition, but does not form a deep socket within which nozzle 32 is received. Preferably. boot 34 is a molded flexible polymeric or rubber material, such as, for example, rubber, neoprene, urethane, or other suitable material. Each circular ridge 118 is preferably approximately 0.5 inch in diameter and approximately 0.06 inch tall. Each inlet 116 opens out through the opposite side of carrier plate 80 in order to face toward tool 84. Conventional pneumatic connectors 120 are fixed on the surface of carrier plate 80 facing tool 84 in order to provide an easy connection point for compressed air lines. Connectors 120 provide working compressed air for operation of tool 84 as needed or to the workpiece.

As shown in FIG. 1, a tool mounting boom 84 is the tool carried in tool carrier member 24. A variety of tools and equipment can be mounted on tool boom 84 in desired configurations. Alternatively, an industrial welding, fastening, or other operative tool 84 may be directly mounted in tool clamp 82.

As used herein in relation to the locking posts 28, seal 30, and valve faces 106 in contact with ridges 118, "radially alignment" refers to alignment that is laterally generally normal to axis of travel 45. This alignment does not necessarily refer to the alignment lying on a radius of seal 30, but may also lie, for example, on a nondiametric chord of the circle formed by seal 30.

In operation, a robot arm 36 carrying base member 22 is advanced toward tool carrier member 24. Tool carrier member 24 is supported in a rack (not shown) or stand. Base mounting member 22 is advanced until sealing wall 87 is received within peripheral wall 46 on tool carrier member 24. Activation piston 56 is then extended by the application of compressed air to inlet port 76. The tapered end 62 of activation piston 56 slides along and engages activation surfaces 50 on locking posts 28 in order to urge posts 28 outwardly. Locking surfaces 48 seat beneath locking pins 92 of tool carrier member 24, with the tapered surface drawing tool carrier and base mounting member 22 into solid engagement. Tapered seal 30 forms a sealing contact with tapered outer wall 88. As base 22 and tool carrier 24 are brought together, pneumatic valve faces 106 contact boot 34 and are forced back into the body of pneumatic supply nozzles 32. Pliable ridges 118 form a tight seal about valve faces 106. Electrical connector contacts 98 and 100 are brought into electrical contact in order to supply power to tool 84. While tool 84 is being utilized by robot 36, activation springs 68 and bellville springs 72 assist in maintaining a solid lock between base mounting member 22 and tool carrier member 24.

In order to remove tool carrier member 24, tool carrier 24 is positioned on a support rack (not shown). Activation piston 56 is retracted by the application of compressed air to inlet port 74. The application of compressed air causes activation piston 56 to withdraw, and springs 54 urge locking posts 28 inwardly. Once locking surfaces 48 clear locking pins 92, the robot may withdraw base mounting member 22. Due to the configuration of tool mounting assembly 20, tool carrier member 24 may twist or roll off of base mounting member 22 with relatively little or no damage to the equipment.

It is to be understood that the above is a description of the preferred embodiments and that various modifications and improvements may be made without departing from the spirit of the invention disclosed herein. The scope of protection afforded is to be determined by the claims which follow and the breadth of interpretation that the law allows.

The embodiments of the invention in which an exclusive property or privilege is claimed are as follows:

1. A mount for selectively, changeably mounting tools on a piece of robotic equipment, the robotic equipment having an associated supply of pressurized fluid to be provided to a tool mounted on the robotic equipment, comprising:
    a robot mount connector base having a first side adapted to be secured to the piece of robotic equipment and a second side opposite said first side;
    a tool carrier member having a first side and an opposite second side, said tool carrier member second side being configured to engage and mate with said second side of said robot mount connector base;
    a tool fastener secured to said first side of said tool carrier member, said tool fastener being adapted to selectively mount and secure a tool thereon;
    a plurality of pressurized fluid base fixtures coupled to said robot mount connector base, said pressurized fluid base fixtures adapted to receive and direct pressurized fluid therethrough, each of said pressurized fluid base fixtures having a first inlet connector adapted to be coupled to the pressurized fluid supply of said robotic equipment, each of said pressurized fluid base fixtures having a reciprocably operated outlet valve with a forwardly disposed valve face that reciprocates toward and away from said robot mount connector base, said outlet valves providing a flow of pressurized fluid through said valve faces when said valve faces are forced toward said robot mount connector bases, and said outlet valves shutting off a flow of pressurized fluid through said valve faces when said valve faces are moved away from said robot mount connector base;
    an elongated elastomeric seal member mounted on said second side of said tool carrier member, said elongated seal member including a plurality of pressurized fluid ports provided thereon, each of said pressurized fluid ports having an outlet with an outlet connector adapted to be operably coupled to a pressurized fluid tubing in order to convey the pressurized fluid to a tool mounted on said tool carrier member, each of said pressurized fluid ports having a port inlet defining a generally planar inlet surface thereabout, said elastomeric seal member further including a raised seat at each of said port inlets, said elastomeric raised seats configured to mateably contact said valve faces of said pressurized fluid base fixture and thereby form a fluid-tight seal at said valve faces when said valve faces are forced into contact and engagement with said elongated elastomeric seal member extending about said plurality of valve faces; and
    a connector lock carried on one of said robot mount connector base and said tool carrier member, said connector lock adapted to selectively engage and fixedly secure the other of said robot mount connector base and said tool carrier member, whereby the seal between said pressurized fluid base fixture and said pressurized fluid inlet ports is formed at said valve faces in order to allow greater tolerances in alignment of said robot mount connector base and said tool carrier member.

2. A mount according to claim 1, wherein said elongated elastomeric seal member comprises an elongated arcuate-shaped elastomeric seal member.

3. The robotic tool mount of claim 2, wherein:
    said robot mount connector base has a central axis of travel along which said robot mount connector base is advanced for connection to said tool carrier member;
    said connector lock comprises at least one locking post reciprocably carried on said second side of said robot mount connector base so as to reciprocate generally normal to said central axis of travel; and said tool carrier member comprises a locking wall generally aligned with said axis of travel and including a lock post seat therein, said lock post seat configured and disposed so as to selectively receive and seat said lock post.

4. The robotic tool mount of claim 3, wherein:

said connector lock comprises a plurality of said lock posts reciprocally mounted on said second side of said robot mount connector base, said lock posts reciprocably carried so as to converge generally toward and diverge generally away from said axis of travel; and said tool carrier member comprises a plurality of lock post seats therein.

5. The robotic tool mount of claim 4, further comprising:

an activation piston reciprocably mounted in said robot mount connector base, said activation piston reciprocably mounted so as to move generally parallel to said axis of travel, said activation piston having an engagement surface configured and disposed to selectively engage and forcibly diverge said lock posts outwardly toward a locked position.

6. The robotic tool mount of claim 5, wherein:

said lock posts are generally radially aligned with said outlet valve's valve face.

7. The robotic tool mount of claim 6, further comprising:

a seal wall projecting about said second side of said robot mount connector base, said seal wall having a tapered seal surface thereon;

said locking wall projecting from said second surface of said tool carrier member, said locking wall having a tapered seal surface sloped to selectively engage and seal against said seal wall; and a seal carried on one of said seal wall and said locking wall.

8. The robotic tool mount of claim 7, wherein:

said lock posts are generally radially aligned with said seal wall.

9. The robotic tool mount of claim 8, further comprising:

a pair of conical alignment posts projecting from one of said robot mount connector base second side and said tool carrier member second side, and a pair of post sockets defined in the other of said second sides, said post sockets dimensioned and disposed to receive said conical alignment posts.

10. A mount according to claim 1, wherein said elongated elastomeric seal comprises a unitary seal.

11. The robotic tool mount of claim 10, wherein:

said raised seats each comprise a raised generally circular ridge encircling and spaced from a respective pressurized fluid port inlet.

12. The robotic tool mount of claim 11, wherein:

said pressurized fluid base fixtures each comprise a generally circular outlet disk having said valve faces thereon, each of said disks having an outer circumference dimensioned to be closely received within a respective raised ridge and having a thickness to be partially received within said respective raised ridge.

13. A mount according to claim 1, wherein said elongated elastomeric seal includes a guide surface for guiding said tool carrier member into alignment with said robot mount connector base.

14. A robot tool mount for selectively mounting a tool on a robot, comprising:

a mounting base having a first side adapted to be secured to the robot and a second side opposite said first side, said second side including a sealing surface;

a tool carrier having a tool mounting fixture on a first side thereof, said tool carrier having a second side opposite said first side;

a plurality of lock posts mounted on said mounting base second side, said lock posts reciprocating between a converged disconnected position and a diverged locked position; and a lock wall of said tool carrier projecting from said tool carrier second side, said lock wall having an outwardly facing tapered surface dimensioned to matingly engage said sealing surface of said mounting base, said lock wall having a plurality of notches with a cylindrical member disposed in each respective notch, said cylindrical members and said notches forming lock seats to receive said lock posts.

15. The robot tool mount of claim 14, wherein:

said lock posts have an outer engaging end disposed to selectively engage a respective lock seat, and each of said outer engaging ends sloped at an acute angle relative said mounting base second end.

16. The robot tool mount of claim 15, further comprising:

an activation post moveably mounted on said mounting base and disposed to be selectively moved between and diverge said lock posts.

17. The robot tool mount of claim 16, wherein:

said activation post has a tapered end, with three tapered surfaces, three said lock posts contacting said activation post tapered surfaces.

18. The robot tool mount of claim 17, further comprising:

a pair of conical guide posts projecting from said mounting base second side;

a pair of sockets defined in said tool carrier second side and disposed to receive said conical guide posts.

19. The robot tool mount of claim 14, further comprising:

a pair of conical guide posts projecting from said mounting base second side;

a pair of sockets defined in said tool carrier second side and disposed to receive said conical guide posts.

20. The robot tool mount of claim 14, further comprising:

a pyramidally shaped activation member reciprocably mounted on said mounting base so as to be selectively moved between and diverge said lock posts.

21. The tool mount of claim 20, further comprising:

a plurality of springs biasing said lock posts toward a converged position.

22. The tool mount of claim 21, wherein:

said lock posts are spring mounted relative to said mounting base second side, said lock posts biased toward said mounting base second side.

23. The tool mount of claim 14, wherein:

said lock posts are spring mounted relative to said mounting base second side, said lock posts biased toward said mounting base second side.

24. A robot tool mount for selectively mounting a tool on a robot, comprising:

a mounting base having a first side adapted to be secured to the robot and a second side opposite said first side;

a tool carrier having a tool mounting fixture on a first side thereof, said tool carrier having a second side opposite said first side;

a plurality of lock posts mounted on said mounting base second side, said lock posts reciprocating between a converged disconnected position and a diverged locked position;

a seal wall projecting from said mounting base second side about said lock posts, said seal wall having an inwardly facing tapered seal surface, said lock posts generally aligned with said seal wall and oriented to diverge toward said seal wall;

a lock wall projecting from said tool carrier second side, said lock wall having an outwardly facing tapered surface dimensioned to matingly engage said seal wall tapered seal surface, said lock wall having a plurality of lock seats formed therein disposed to receive said lock posts, each of said lock seats comprising a notch with a cylindrical bar disposed in each respective notch, each of said lock posts having an outer engaging end disposed to selectively engage a respective lock seat, and each of said outer engaging ends sloped at an acute angle relative said mounting base second end.

25. A robot tool mount according to claim 24, further comprising at least one pressurized fluid base fixture coupled to said robot mount connector base, said pressurized fluid base fixture adapted to receive and direct pressurized fluid therethrough, said pressurized fluid base fixture having a first inlet connector adapted to be coupled to a pressurized fluid supply of a robotic equipment, said pressurized fluid base fixture having a reciprocably operated outlet valve with a forwardly disposed valve face that reciprocates toward and away from said robot mount connector base, said outlet valve providing a flow of pressurized fluid through said valve face when said valve face is forced toward said robot mount connector base and said outlet valve shutting off a flow of pressurized fluid through said valve face when said valve face is moved away from said robot mount connector base; and at least one pressurized fluid port provided on said tool carrier, said pressurized fluid port having an outlet with an outlet connector adapted to be operably coupled to a pressurized fluid tubing in order to convey the pressurized fluid to a tool mounted on said tool carrier, said pressurized fluid port having a port inlet defining a generally planar inlet surface.

26. A robot tool mount according to claim 25, further comprising an elastomeric seal member extending around said pressurized fluid port, said elastomeric seal member forming an elastomeric raised seat about said port inlet, and said elastomeric raised seat being configured to mateable contact said valve face of said pressurized fluid based fixture thereby forming a fluid-tight seal at said valve face when said valve face is forced into contact and engagement of said elastomeric seal member.

27. A robot tool mount according to claim 26, wherein said elastomeric seal member comprises an arcuate elastomeric boot.

28. A robot tool mount for selectively mounting a tool on a robot, comprising:

a mounting base having a first side adapted to be secured to the robot and a second side opposite said first side;

a tool carrier having a tool mounting fixture on a first side thereof, said tool carrier having a second side opposite said first side;

a plurality of lock posts mounted on said mounting base second side, said lock posts reciprocating between a converged disconnected position and a diverged locked position;

a seal wall projecting from said mounting base second side about said lock posts, said seal wall having an inwardly facing tapered seal surface, said lock posts generally aligned with said seal wall and oriented to diverge toward said seal wall;

a lock wall projecting from said tool carrier second side, said lock wall having an outwardly facing tapered surface dimensioned to matingly engage said seal wall tapered seal surface, said lock wall having a plurality of lock seats formed therein disposed to receive said lock posts, and each of said lock seats comprising a notch with a cylindrical bar disposed in each respective notch.

29. A robot tool mount according to claim 28, further comprising: at least one pressurized fluid base fixture coupled to said robot mount connector base, said pressurized fluid base fixture adapted to receive and direct pressurized fluid therethrough, said pressurized fluid base fixture having a first inlet connector adapted to be coupled to a pressurized fluid supply of a robotic equipment, said pressurized fluid base fixture having a reciprocably operated outlet valve with a forwardly disposed valve face that reciprocates toward and away from said robot mount connector base, said outlet valve providing a flow of pressurized fluid through said valve face when said valve face is forced toward said robot mount connector base and said outlet valve shutting off a flow of pressurized fluid through said valve face when said valve face is moved away from said robot mount connector base; and at least one pressurized fluid port provided on said tool carrier, said pressurized fluid port having an outlet with an outlet connector adapted to be operably coupled to a pressurized fluid tubing in order to convey the pressurized fluid to a tool mounted on said tool carrier, said pressurized fluid port having a port inlet defining a generally planar inlet surface.

30. A robot tool mount according to claim 28, further comprising an elastomeric seal member extending around said pressurized fluid port, said elastomeric seal member forming an elastomeric raised seat about said port inlet, and said elastomeric raised seat being configured to mateable contact said valve face of said pressurized fluid based fixture thereby forming a fluid-tight seal at said valve face when said valve face is forced into contact and engagement of said elastomeric seal member.

31. A robot tool mount according to claim 30, said elastomeric seal member comprises an arcuate elastomeric boot.

32. A mount for selectively, changeably mounting tools on a piece of robotic equipment, the robotic equipment having a supply of pressurized fluid to be provided to a tool mounted on said mount, said mount comprising:

a base having a first side and a second side, said first side being adapted to be secured to the piece of robotic equipment, said second side being opposite from said first side and including a plurality of supply nozzles extending therefrom;

a tool carrier member having a first side and a second side, said first side of said tool carrier member being adapted to support a tool and including a plurality of connectors, said first side of said tool carrier being opposite from said second side of said tool carrier member, and said second side of said tool carrier member being configured to releasably engage and releasably mate with said second side of said base and including an elongate recess;

an elastomeric body having a plurality of transverse openings, each of said transverse openings defining an inlet port for sealingly engaging a respective supply nozzle of said plurality of supply nozzles, each of said inlet ports being in communication with a respective connector of said plurality of connectors, said elastomeric body being positioned in said elongate recess, each of said supply nozzles being adapted to provide a flow of pressurized fluid through said supply nozzles when said supply nozzles are aligned with and urged into engagement with said inlet ports of said elastomeric body and to shut off the flow of pressurized fluid through said nozzles when said supply nozzles are disengaged from said inlet ports, said elastomeric body sealing said supply nozzles against said tool carrier member and aligning said supply nozzles with said transverse openings in said elastomeric body and said connectors for delivering a supply of pressurized fluid through said connectors to a tool mounted on said tool carrier member.

33. A mount according to claim 32, wherein said elastomeric body comprises an elongated elastomeric body having opposed distal ends.

34. A mount according to claim 32, wherein said elongate recess comprises an arcuate recess.

35. A mount according to claim 32, wherein said second side of said tool carrier member includes an outer surface, said elastomeric body being positioned in said elongate recess below said outer surface.

36. A mount according to claim 32, wherein said elastomeric body has a snug fit in said recess.

37. A mount according to claim 32, wherein each of said inlet ports includes a ridge encircling the respective inlet port, said ridges sealing against said second side of said base when said tool carrier member is engaged with said base.

38. A robot tool mount for selectively mounting a tool on a robot, comprising:

a base having a first side adapted to be secured to the robot and a second side opposite said first side, said second side of said base including an annular wall defining a receiving socket;

a tool carrier member having a first side adapted to support a tool and a second side opposite said first side, said tool carrier member aligning with said base along an axis and seating in said socket when mounted to said base;

a plurality of lock posts mounted on said second side of said base and being arranged in a plane generally orthogonal to said axis, each of said lock posts having an inwardly extending end and an outwardly extending end, said lock posts moving between a converged disconnected position and a diverged locked position where said outwardly extending ends extend toward said annular wall for engaging said tool carrier member when said tool carrier member is mounted on said base, and said lock posts are biased in said converged disconnected position; and an activation member moveably mounted on said base along said axis, said activation member having a shaft and an end portion having a plurality of tapers corresponding to said lock posts, said tapers urging said lock posts outwardly from said converged disconnected position to said diverged locked position when said activation member protrudes from said base and moves from a retracted unlocking position toward an extended locking position, and said tapers disengaging from said lock posts when said activation member is in said extended locking position hereby locking said lock posts in said diverged locked position.

39. The robot tool mount of claim 38, wherein said second side of said base includes three lock posts.

40. The robot tool mount of claim 38, wherein said tool carrier member includes a lock wall projecting from said second side of said tool carrier member, said lock wall having an outwardly facing surface dimensioned to matingly engage said annular wall of said base and including a plurality of lock seats formed therein to receive said lock posts.

41. The robot tool mount of claim 40, wherein each of said lock seats comprises a notch with a cylindrical member disposed in each respective notch.

42. The robot tool mount of claim 38, wherein each of said lock posts includes a spring, said springs biasing said lock posts toward said converged disconnected position.

43. The robot tool mount of claim 38, wherein each of said activation member includes at least one spring biasing said activation member toward said extended locking position.

* * * * *

UNITED STATES PATENT AND TRADEMARK OFFICE
CERTIFICATE OF CORRECTION

PATENT NO. : 5,782,571
DATED : July 21, 1998
INVENTOR(S) : Donald L. Hufford, Maurice Samuel Perlman, William Louis Scott It is certified that error appears in the above-identified patent and that said Letters Patent is hereby corrected as shown below:

Column 8, line 27:

"bases" should be --base--.

Column 14, line 20:

"hereby" should be --thereby--.

Signed and Sealed this

Twentieth Day of June, 2000

*Attest:*

Q. TODD DICKINSON

*Attesting Officer*  *Director of Patents and Trademarks*